United States Patent
Modolo

[11] Patent Number: 5,188,200
[45] Date of Patent: Feb. 23, 1993

[54] DEVICE FOR OBTAINING THE OPERATING SYMMETRY OF A BICYCLE BRAKE

[75] Inventor: Domenico Modolo, Conegliano, Italy

[73] Assignee: Modolo Technologie Avanzate S.R.L., Treviso, Italy

[21] Appl. No.: 730,935

[22] PCT Filed: Feb. 6, 1990

[86] PCT No.: PCT/IT90/00010
§ 371 Date: Aug. 2, 1991
§ 102(e) Date: Aug. 2, 1991

[87] PCT Pub. No.: WO90/09305
PCT Pub. Date: Aug. 23, 1990

[30] Foreign Application Priority Data
Feb. 10, 1989 [IT] Italy ................ 19380 A/89

[51] Int. Cl.⁵ .................... B62L 1/00; B62L 1/12
[52] U.S. Cl. .................... 188/24.11; 188/24.19; 267/173
[58] Field of Search ........... 188/24.11, 24.12, 24.15, 188/24.19, 24.22, 26; 267/155, 167, 173

[56] References Cited

U.S. PATENT DOCUMENTS

| 3,314,504 | 4/1967 | Altenburger | 188/24.19 |
| 4,064,972 | 12/1977 | Ohtani et al. | |
| 4,290,507 | 9/1981 | Brown | 188/24.15 |
| 4,625,835 | 12/1986 | Coué | 188/24.11 |
| 4,718,521 | 1/1988 | Hosokawa | 188/24.19 |
| 4,852,698 | 8/1989 | Nagano | 188/24.19 |

FOREIGN PATENT DOCUMENTS

2502099 9/1982 France .
2029531 3/1980 United Kingdom .

*Primary Examiner*—Robert J. Oberleitner
*Assistant Examiner*—Peter M. Poon
*Attorney, Agent, or Firm*—Wegner, Cantor, Mueller & Player

[57] ABSTRACT

A device for generating the synchronism of actuation of the two calipers (1,2) of a caliper brake for bicycles fulcrumed onto the frame by means of a pivot bolt (3) comprising a rocking lever (K) fulcrumed about a pivot (6) integral with a support plate (S) fastened to the pivot bolt (3) of the caliper brake, and urged by an elastic spring (M) against respective points of force (h1, h2) of the calipers (1,2).

7 Claims, 2 Drawing Sheets

DEVICE FOR OBTAINING THE OPERATING SYMMETRY OF A BICYCLE BRAKE

The object of the present invention is a bicycle caliper brake fulcrumed onto the bicycle frame by means of a pivot bolt, incorporating a device for generating synchronous actuation of the two calipers.

In the caliper brakes for bicycles, which, as well-known, comprise a pair of brake pad carrier calipers, pivotally fastened onto the frame, which close onto the wheel rim when the brake is actuated, and, under the action of elastic means, are returned back to their resting position when the braking action ends, attempts aiming at obtaining the operating symmetry of the two calipers were always carried out, but good results were never obtained.

In fact, there are many factors which tend to generate a dissymmetry in calipers operation, such as lever ratios, frictions, geometries imposed by the frame and by the structure of the bicycle, different tensions of the two reaction ends of the brake-spring, various elasticity factors between the brake cable and its respective external sheath, and between the two brake calipers, imperfect assemblages, and so on.

Most systems adopted until now in order to try to obtain such an operating synchronism proved to be unsatisfactory, since all of them are affected by the dissimmetry factors listed above.

Other systems know from the prior art, aiming at achieving the intended purpose, require the brake to be fixedly mounted on its supporting bolt, with said brake being hence prevented from swinging on the wheel rim, said swinging being however necessary in order to compensate small geometrical differences, or low-entity twistings, without endangering the braking efficiency.

Other systems are extremely sophisticated and expensive and require special adjustments of the elastic means which act on the calipers.

U.S. Pat. No. 4,064,972 discloses complex means for maintaining equally the free gaps between the left and right brake shoes and the rim in a bicycle caliper brake.

GB-A-2 029 531 describes a center adjusting device for a caliper brake apparatus for adjusting the distance between the brake shoes and the rim.

The purpose of the present invention is to supply a bicycle brake with a cheap device, which secures the perfect synchronism of actuation of the two calipers of the brake, independently from the variety of forces which can act on each caliper, still permitting the brake to swing on the wheel rim.

The device according to the present invention, as defined in the characterizing portion of the appended claim 1, substantially comprises a rocking lever fulcrumed onto a support integral with the pivot bolt on which both brake calipers are pivotally mounted, with said rocker lever being subjected to the action of elastic means and being subjected, at two opposite points with respect to the fulcrum axis, to respective force points of the two brake calipers.

The symmetry of actuation of the calipers derives from the positioning of the rocker lever, which obliges the respective force points of the calipers to rotate always by same angles, opposite with respect to the fulcrum axis of the rocker lever, thus generating symmetrical movements of the calipers.

According to a preferred embodiment of the invention, the elastic means acting on the rocker lever also serve to return the calipers back to their rest position and are preferably constituted by a spring wound around the rocker lever fulcrum pivot, an end of which spring urges the free end of said rocker lever towards the corresponding caliper, while the other end thereof acts against the brake pivot bolt. According to a further embodiment of the invention said spring could be wound as well around the brake pivot bolt, and could be fixed to said brake pivot bolt at one of its ends, while its other end still acts against the farther end of said rocker lever, pressing said farther end against the force points of the corresponding caliper.

Preferably, the device according to the present invention, and, in particular, the rocker lever, is positioned on the rear side of the brake, so as to be hidden by one of the two brake calipers, without jeopardizing the aesthetical features of the brake.

Further features of the invention will be clearer from the following detailed description, referring to a merely exemplifying, non-limitative form of practical embodiment thereof, as illustrated in the hereto attached drawings, in which.

Figure 1:
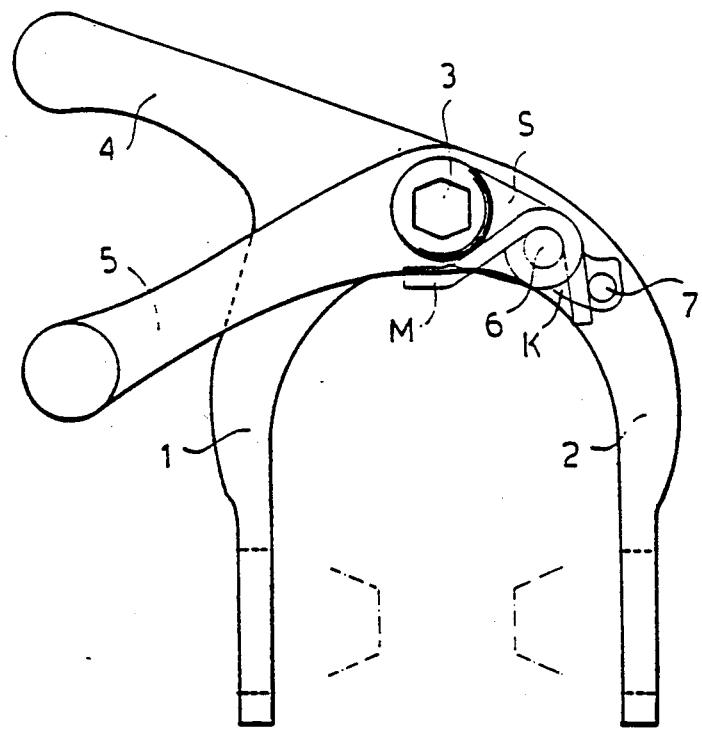
FIG. 1 shows a schematic front view of a bicycle brake, equipped with the device for actuation synchronism according to the present invention, positioned on the rear side of the brake, and showed in transparence.

Referring to such figures, the reference numerals 1 and 2 indicate two brake pad carrier calipers, which from now on are also denominated as the "left-hand caliper" and the "right-hand caliper", respectively, showing respective arms 4 and protruding from a same side.

Figure 2:
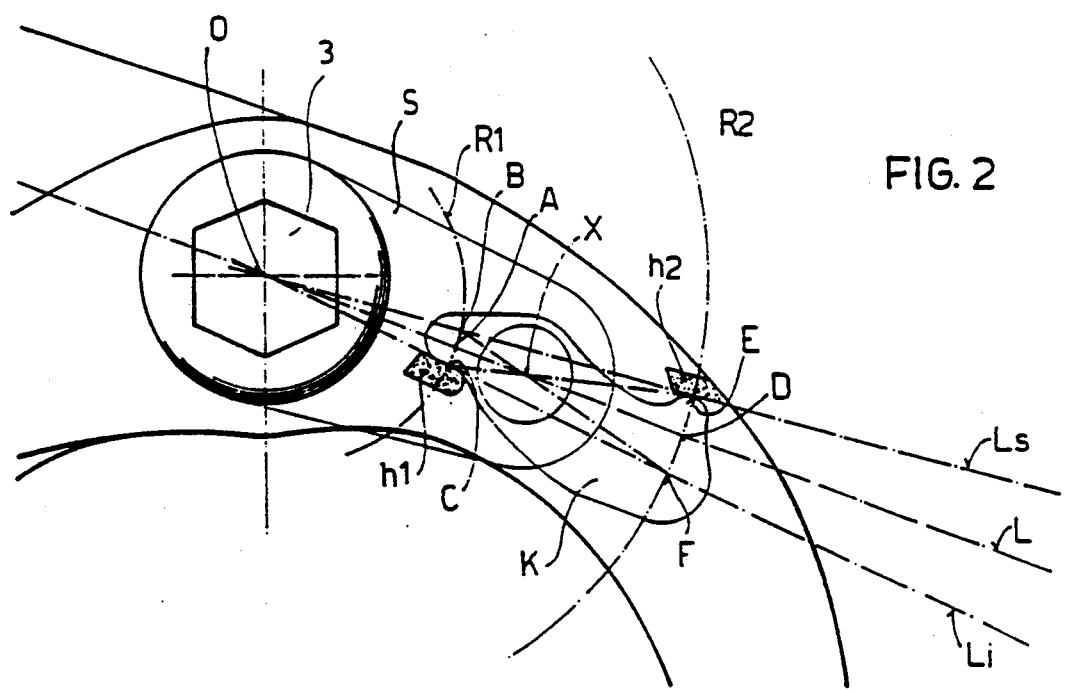
FIG. 2 shows an enlarged view of the portion of brake in FIG. 1 interested by the device according to the present invention.

The calipers 1 and 2 are pivoted onto the bicycle frame by means of a pivot bolt 3, the axis of which is indicated by the letter O in FIGS. 1 and 2.

When braking, in a known way, the arms 4 and 5 are approached to each other, thus causing the brake pad carrier calipers 1 and 2 to close on the bicycle wheel rim. When the bicycle driver releases the brake actuation lever, elastic means interposed between the calipers 1 and 2 return these latter into their rest position, in which they are spaced apart from each other.

Figure 3:
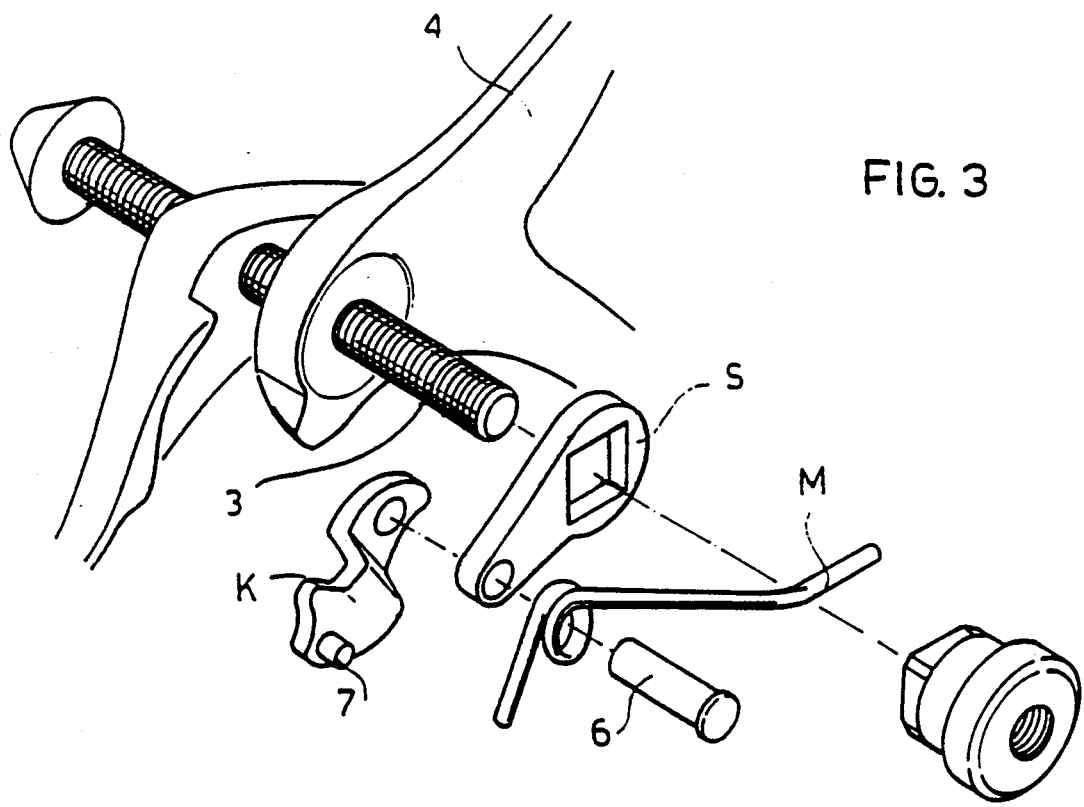
FIG. 3 shows a perspective view from the rear side relatively to FIGS. 1 and 2, showing, in exploded view, the parts which compose the device according to the present invention.

According to the present invention, means are provided to achieve the symmetry of actuation of the calipers 1 and 2, which will be described now. Such means are positioned on the rear side of the caliper 2, as shown in FIG. 3, and, just for the sake of convenience, are shown in transparence in FIGS. 1, 2 and 4.

Such means substantially comprises a support plate S, an end of which is fixed to the pivot bolt 3 and whose other end bears a stud 6 fixedly mounted on it; the axis of the stud 6 is indicated by the letter X in FIG. 2.

On the stud 6 a rocker lever K is fulcrumed, which rocker lever K engages, on opposite sides relatively to the fulcrum stud 6, with the left-hand caliper 1 and with the right-hand caliper 2, at points of these latter, which are respectively indicated by the reference characters h1 and h2, under the action of elastic means.

The elastic means are constituted in particular by a helical spring M which, in the embodiment according to the FIGS. from 1 to 3, is mounted on the fulcrum stud 6 and with its end portions respectively acts against the brake pivot bolt 3, and against a stud 7 fixedly mounted on the free end of the rocker lever K. According to the embodiment shown in FIG. 4, the spring M is mounted on the brake pivot bolt 3, with one of the ends of said spring M being integral with said pivot stud, and its other end still acting against the stud 7.

In both of said cases, the effect of the spring M is the same, i.e., the spring M causes the rocker lever K to return back to its rest position, and simultaneously supplies the necessary energy for the calipers 1 and 2 to return back to their respective rest positions after each brake actuation stroke.

The symmetry of actuation of the calipers 1 and 2 is determined by the rocker lever K, whose fulcrum axis X and whose points of contact with the calipers 1 and 2 are determined by means of the geometrical construction described in the following, referring in particular to FIG. 2, made on a plane perpendicular to the brake pivot bolt 3.

Starting from the fulcrum centre 0 of the calipers 1 and 2, a straight line L is drawn, which is orientated so as to result approximately in a central position relatively to the width of either of the two calipers (caliper 2 in FIG. 2), so that the device according to the present invention, which will develop around said line, is hidden behind said caliper. The fulcrum point X of rocker lever K will lay on this line L.

From the same point 0, two further straight lines Ls and Li are drawn, which form an angle, of which the line L will be the bisecting line. Such an angle will approximately be the necessary angle for the brake calipers 1 and 2 to reach their minimal and maximal opening; for examples, said angle will be about 5°.

From the centre 0 a circle arc R1 is drawn, on which the point of reaction of the left-hand caliper 1 will lay. The radius of the arc R1 will be chosen mainly according to the dimensions of the brake. The points of intersection between the arc R1 and the lines L, Ls and Li, respectively indicated by A, B and C, are marked.

From the centre 0 a second circle arc R2, having a longer radius than arc R1, is drawn; the reaction point of the right-hand caliper 2 will lay on said circle arc R2. The points of intersection between arc R2 and lines L, Ls and Li are marked; they are respectively indicated by letters D, E and F.

Intersecting the line segments which respectively join the points C and E, and the points B and F, a point situated on the line L will result, which corresponds to the fulcrum centre X of rocker lever K.

The point C and E, diagonally opposite to the point X are points of the rocker lever K which come into contact with the force points of their calipers 1 and 2, respectively, indicated in FIG. 2 with blocks, shown in sectional view, h1 and h2.

From the above, the synchronism of actuation of the calipers clearly appears.

Figure 4:
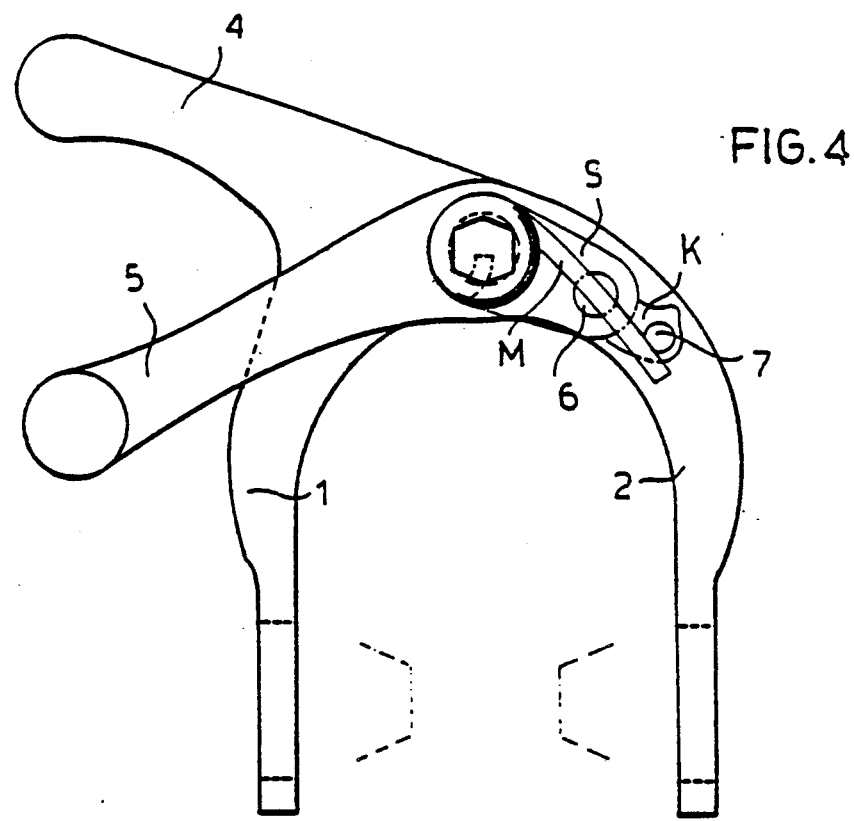
FIG. 4 is a view similar to that in FIG. 1, showing a different arrangement of the spring which returns the device back to its rest position after each actuation stroke.

In fact, the spring M, both in the arrangement shown in figures from 1 to 3, and in the arrangement shown in FIG. 4, urges the points C and E of the rocker lever K respectively against the corresponding force points h1 and h2 of the left-hand caliper 1 and of the right-hand caliper 2. Therefore, when the brake is actuated, forces, even though not perfectly symmetrical, applied to the two calipers, will cause the rocker lever K to rotate around its fulcrum centre X, which rotation will cause equal angular rotations of the points C and E. In other words, the angle with respect to the centre X which will form the point C moving clockwise, with reference to FIG. 2, will be exactly equal to the angle generated by the point E. As the contrast points h1 and h2 of the calipers 1 and 2 are obliged by the spring M to perform the same movements of the points C and E respectively, so the mutual synchronism of actuation of the calipers is achieved.

As soon as the braking action ends, the spring M will cause both brake calipers 1 and 2 to return back to their respective rest position.

Therefore, the spring M replaces the traditional return spring of the calipers of bicycle brakes, and, as compared to this latter, results to be much lighter, cheaper and more reliable.

Of course, the invention is not limited to the particular embodiment as described above and illustrated in the hereto attached drawings, but it can be modified in its details without thereby departing from the scope of the present invention.

I claim:

1. Device suitable for generating the synchronism of actuation of the two calipers (1, 2) of a bicycle brake fulcrumed onto the bicycle frame by means of a pivot bolt (3), characterized in that said device is provided with a rocker lever (K) fulcrumed about a stud (6) integral with said brake pivot bolt (3), and urged by elastic means (M) to act, with respective points (C, E) diagonally opposite to each other relatively to the centre (X) of the fulcrum stud (6), against respective points (h1, h2) of the calipers (1, 2).

2. Device according to claim 1, characterized in that said fulcrum stud (6) of the rocker lever (K), is borne by a support plate (S) integral with the brake pivot bolt (3).

3. Device according to claim 1, characterized in that said elastic means (M) are constituted by a spring mounted on the fulcrum stud (6) of the rocker lever, and acting, with its end portions, against the brake pivot bolt (3) and against a stud (7) fixedly mounted on the free end of the rocker lever (K), respectively, so as to force the rocker lever to return back to its rest position, while simultaneously supplying the necessary energy for causing the calipers (1, 2) to return back to their respective rest position.

4. Device according to claim 1, wherein said elastic means (M) are constituted by a spring mounted on the brake pivot bolt (3), with one end of said spring being affixed to this latter, and the other end of said spring acting against a stud (7) fixedly mounted on the free end of the rocker level (K), so as to force the rocker lever to return back to its rest position, while simultaneously supplying the necessary energy to cause the calipers (1, 2) to return back to their respective rest positions.

5. Device according to claim 1, characterized by being positioned on the rear side of one of the two calipers (1, 2), so as to be completely hidden by said caliper.

6. Device according to claim 1, characterized in that the centre (X) of the fulcrum stud (6) of the rocker lever (K) and the points (C, E) of contrast of the rocker lever (K) with the calipers (1, 2), are obtained with the following geometric construction made on a plane perpendicular to the brake pivot bolt (3):

starting from the centre (0) of the brake pivot axis (3), a straight line (1) is drawn in the direction of one of the two calipers, then two further straight lines (Ls, Li) are drawn, which form an angle in (0) which approximately corresponds to the necessary angle to enable the brake to reach its minimal and its maximal opening, such that the straight line (L) is the bisecting line of such an angle;

two circle arcs (R1, R2) are drawn, with centre in (0) and such that the radius of (R2) is longer than the radius of (R1), and the intersection points, respectively (A, B, C) and (D, E, F) of said circle arcs (R1, R2) with the straight lines (L, Ls, Li) are obtained;

the centre (X) of the fulcrum axis (6) of the rocker lever will be obtained intersecting the lines which join the diagonally opposite points (C, E) and (B, F), the points of contrast of the rocker lever (K) with the calipers (1, 2) respectively being the points (C, E), diagonally opposite with respect to the centre (X).

7. Device according to claim 6, characterized in that said straight line (L) is orientated approximately centrally to the width of one of the two calipers (1, 2), so that the device, which develops around said line, is contained within the width of one of the two calipers (1, 2) and is consequently hidden by the latter.

* * * * *